United States Patent
Katayama et al.

(10) Patent No.: US 6,704,041 B2
(45) Date of Patent: *Mar. 9, 2004

(54) IMAGE PROCESSING METHOD, APPARATUS AND MEMORY MEDIUM THEREFOR

(75) Inventors: Tatsushi Katayama, Tokyo (JP); Hideo Takiguchi, Kawasaki (JP); Kotaro Yano, Yokohama (JP); Kenji Hatori, Yokohama (JP)

(73) Assignee: Canon Kabushiki Kaisha, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/264,721

(22) Filed: Mar. 9, 1999

(65) Prior Publication Data

US 2003/0035047 A1 Feb. 20, 2003

(30) Foreign Application Priority Data

Mar. 10, 1998 (JP) ............................................ 10-075079

(51) Int. Cl.$^7$ ................................................. H04N 7/00
(52) U.S. Cl. ......................................... 348/36; 382/285
(58) Field of Search ........................ 348/47, 362, 588, 348/42, 584, 36; 382/284, 111, 309, 152, 285; 358/488; 345/435, 418, 433

(56) References Cited

U.S. PATENT DOCUMENTS

| | | | | |
|---|---|---|---|---|
| 5,646,679 A | * | 7/1997 | Yano et al. | 348/47 |
| 5,649,032 A | * | 7/1997 | Burt et al. | 382/284 |
| 5,937,081 A | * | 8/1999 | O'brill et al. | 382/111 |
| 6,097,854 A | * | 8/2000 | Szeliski et al. | 382/284 |
| 6,111,667 A | * | 8/2000 | Mishima et al. | 358/488 |
| 6,204,881 B1 | * | 3/2001 | Ikeda et al. | 348/362 |
| 6,243,103 B1 | * | 6/2001 | Takiguchi et al. | 345/435 |
| 6,282,330 B1 | * | 8/2001 | Yokota et al. | 382/309 |

OTHER PUBLICATIONS

U.S. patent application Ser. No. 08/767,018 filed Dec. 16, 1996.
U.S. patent application Ser. No. 09/163,344 filed Sep. 30, 1998.
U.S. patent application Ser. No. 08/719,716 filed Sep. 25, 1996.
U.S. patent application Ser. No. 08/864,470 filed May 28, 1997.

* cited by examiner

*Primary Examiner*—Vu Le
*Assistant Examiner*—Behrooz Senfi
(74) *Attorney, Agent, or Firm*—Fitzpatrick, Cella, Harper & Scinto

(57) ABSTRACT

There is provided an image combining apparatus comprising an image input unit for entering photographed images, an image memory for temporarily storing the entered images, a corresponding point extracting unit for extracting the corresponding point information between the images stored in the image memory, a photographing method discriminating unit for discriminating the photographing method at the photographing operation based on the extracted corresponding point information, a combination process unit for appropriately combining the images according to the discriminated photographing method, and a combined image memory for storing the combined image. The corresponding point extraction unit extracts the corresponding points between two images, and the photographing method discrimination unit discriminates whether the translational photographing method or the panning photographing method is used. The combination process unit executes combination of the images, based on the discriminated photographing method. The invention also provides an image processing method capable of automatically selecting the image combining method, solely from the images.

34 Claims, 18 Drawing Sheets

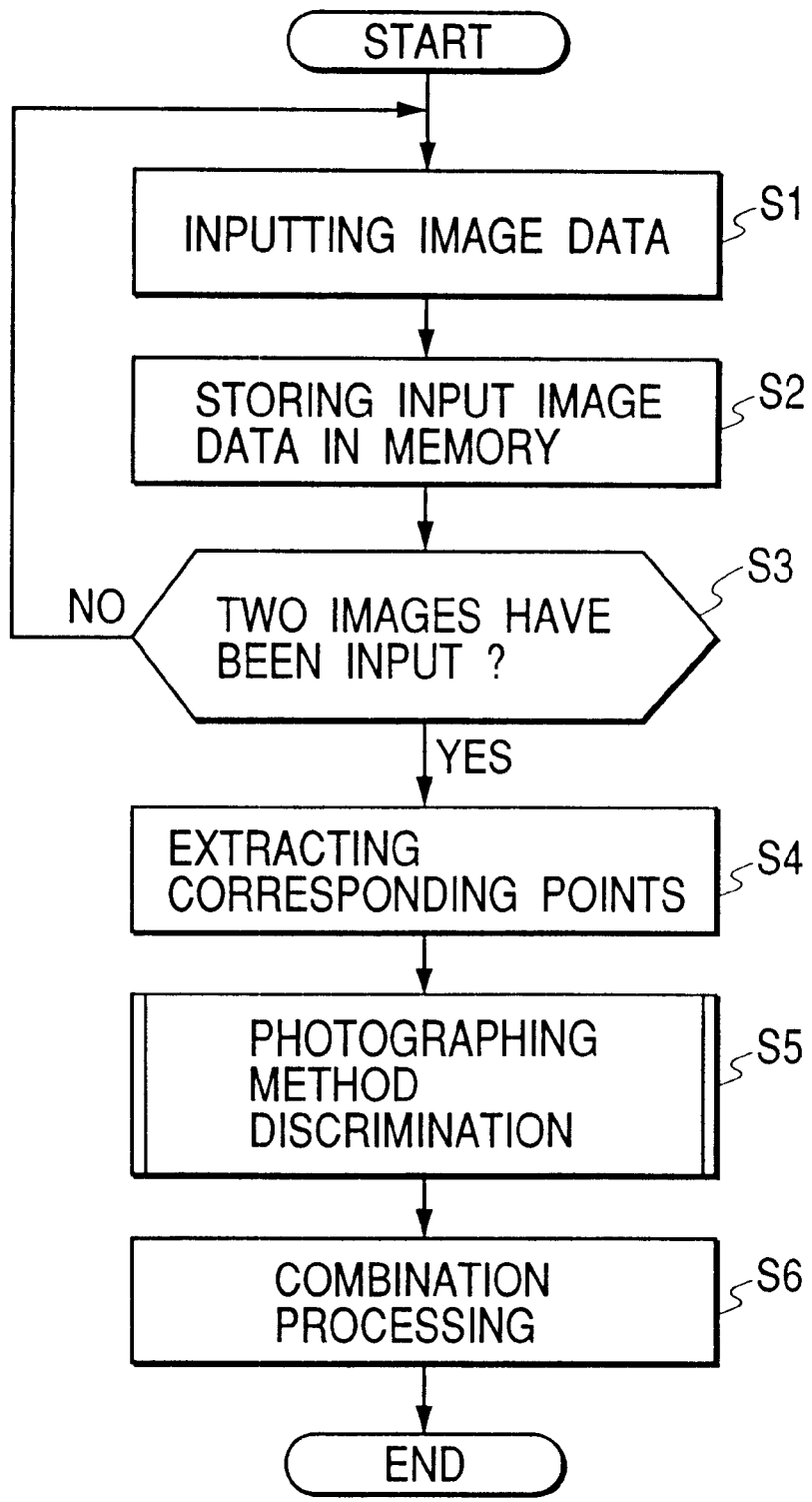

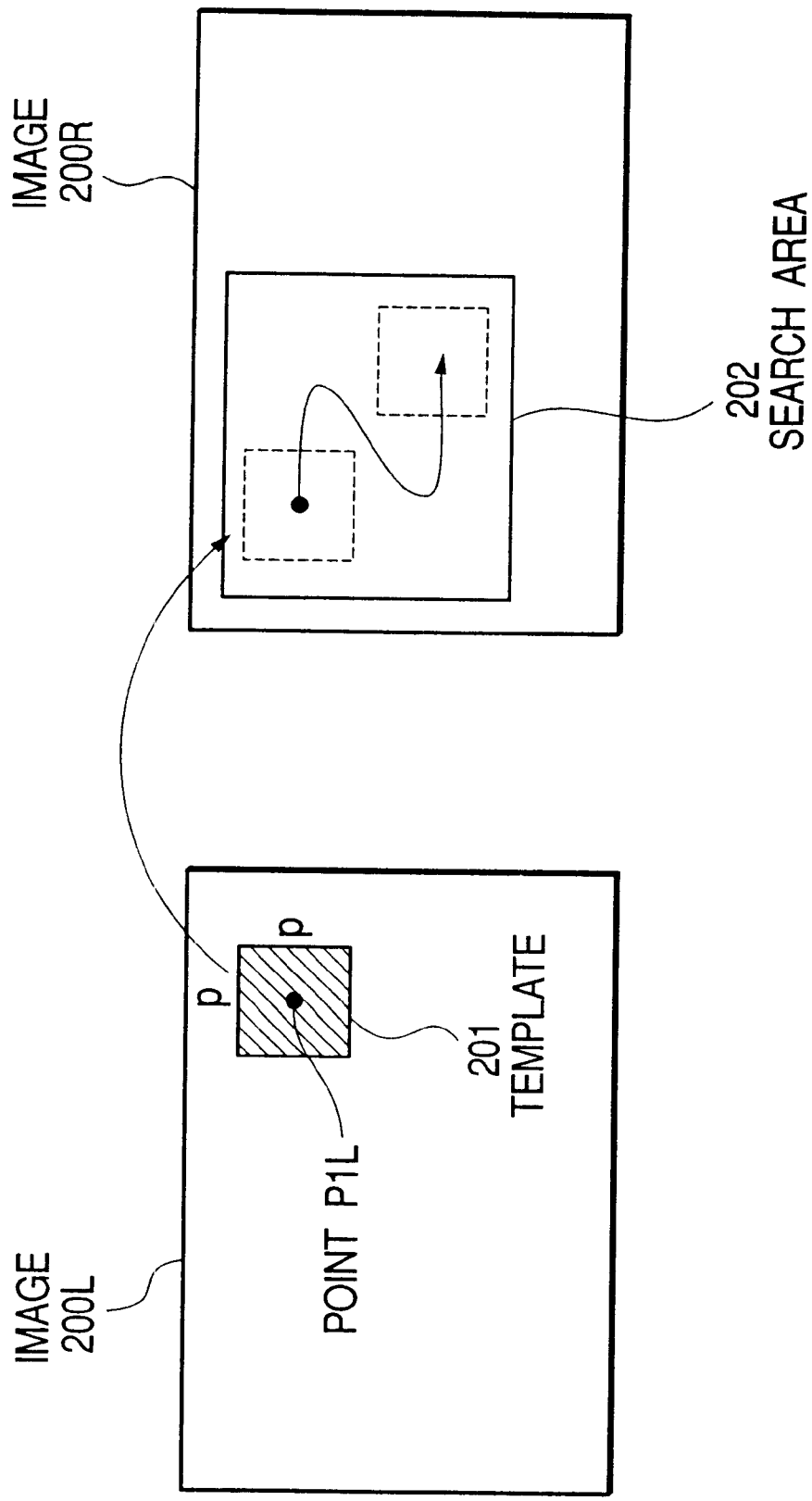

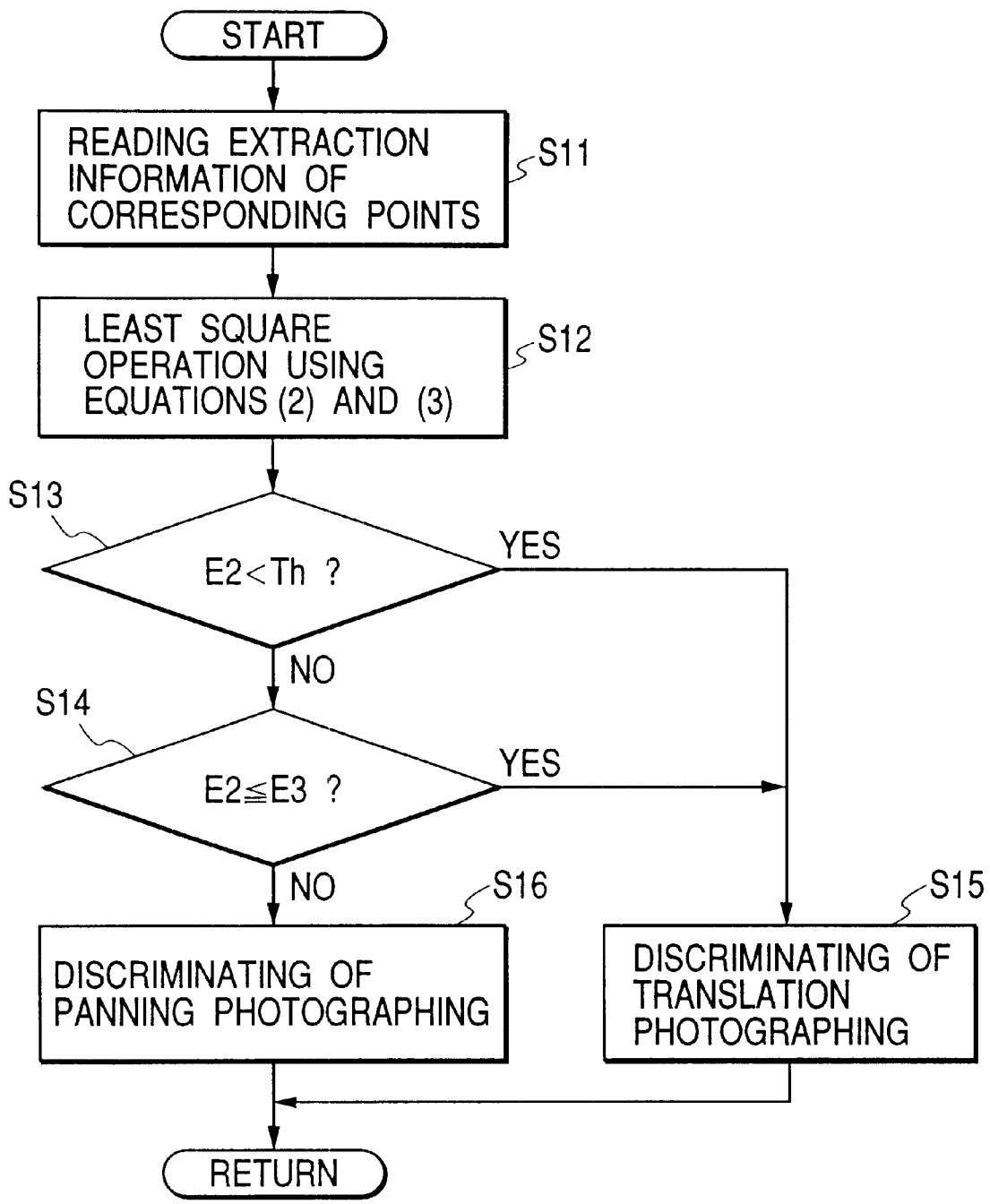

IMAGE PROCESSING METHOD, APPARATUS AND MEMORY MEDIUM THEREFOR

BACKGROUND OF THE INVENTION

1. Field of the Invention

The present invention relates to an image combining method for combining partially overlapping plural images to generating a panoramic image or a high definition image, and an apparatus and a memory medium therefor.

2. Related Background Art

In a case of generating, for example, a panoramic image by combining plural images, it is important to select an appropriate combining process according to the photographing method. The combining process mentioned above is for example an affine conversion, a projection conversion, a cylindrical mapping conversion, etc.

Conventionally, the photographing method is either entered by the operator at the time of performing the combining operation, or estimated based on information from hardware such as a gyro, mounted on the camera at the time of the photographing operation.

In the former method, however, the operator is required to enter information identifying the photographing method at the time of performing the combining operation and has therefore to remember the situation of the photographing operation. On the other hand, the latter method is associated with a drawback that the camera itself becomes bulky since the gyro or other detector has to be mounted on the camera. Also, in case of an off-line combining operation, the output of the gyro has to be retained by a suitable method.

SUMMARY OF THE INVENTION

In consideration of the foregoing, an object of the present invention is to provide an image processing method utilizing images and capable of automatically selecting the combining method.

Another object of the present invention is to use an image for discriminating the photographing method and to effect image combination according to the photographing method, thereby achieving image combination of a higher definition, depending on the photographing method.

Still another object of the present invention is to evaluate the image combination based on at least one of plural combining methods, thereby selecting an appropriate combining method.

Still another object of the present invention is to extract a corresponding point in an overlapping area of plural images, thereby selecting the combining method in more exact manner.

Still another object of the present invention is to enable easier discrimination of translation displaced photographs or panned photographs by employing cylindrical mapping conversion or spherical mapping conversion.

Still another object of the present invention is to enable automatic formation of a panoramic (for 360° around) image with a higher precision.

An image processing method according to an aspect of the present invention comprises an input step of entering plural images, and a selection step of selecting an appropriate combining method from plural combining methods, utilizing the plural image information.

Still other objects of the present invention, and the features thereof, will become fully apparent from the following detailed description of the preferred embodiments, to be taken in conjunction with the attached drawings.

BRIEF DESCRIPTION OF THE DRAWINGS

FIG. 4 is a flow chart showing an image combining sequence of the image combining apparatus;

FIG. 5 is a view schematically showing a corresponding point extracting process;

FIG. 7 is a flow chart showing a photographing method discriminating sequence on a photographing method discriminating unit 102;

DETAILED DESCRIPTION OF THE PREFERRED EMBODIMENTS

Figure 1:
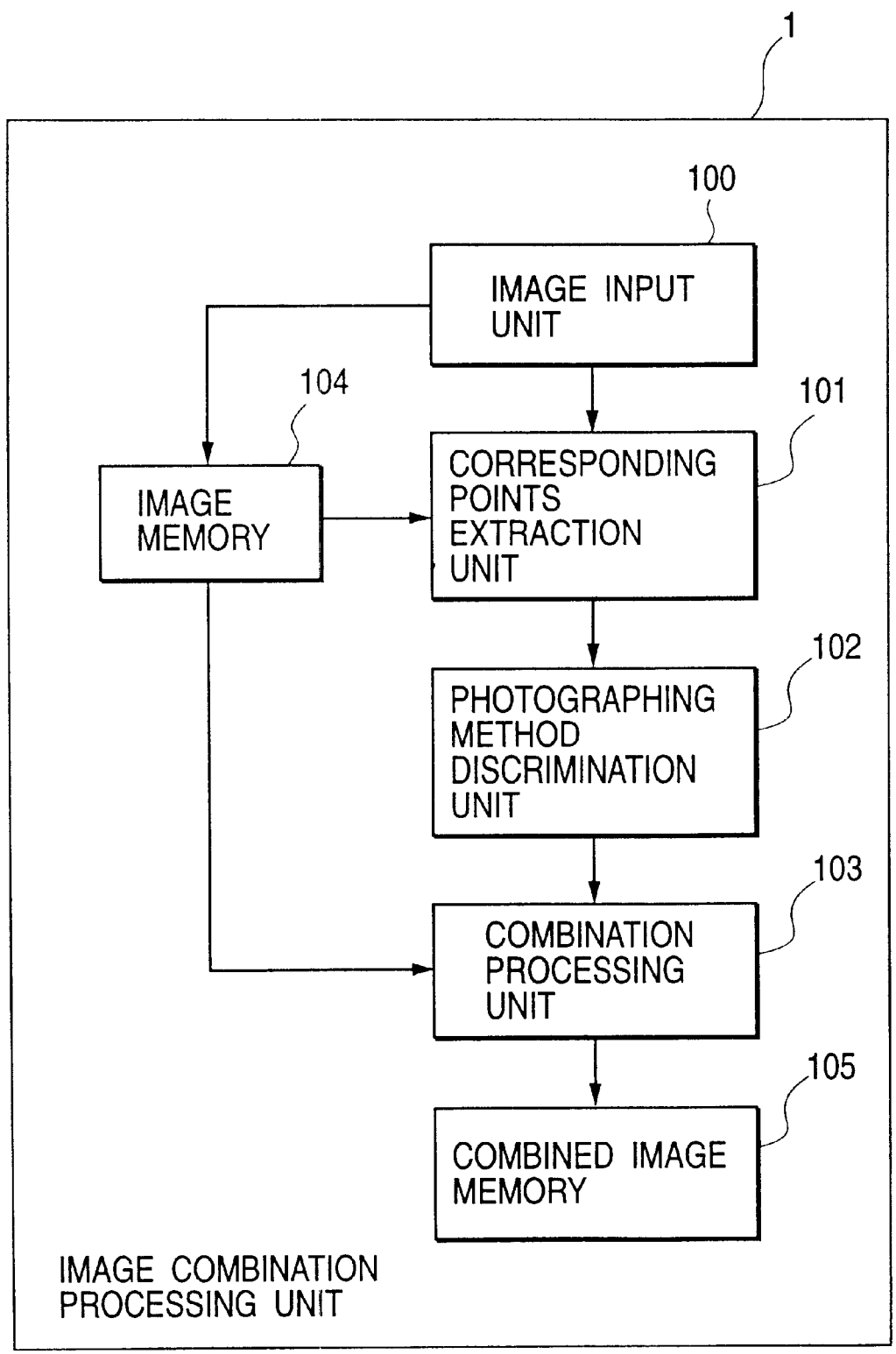
FIG. 1 is a block diagram showing the configuration of an image combining apparatus of a first embodiment.

FIG. 1 is a block diagram showing the configuration of an image combination apparatus of a first embodiment of the present invention, wherein shown are an image combination process unit 1, an image input unit 100 for entering photographed images, an image memory 104 for temporarily storing the input images, and a corresponding point extraction unit 101 for extracting the corresponding point information among the images stored in the image memory 104.

There are further provided a photographing method discrimination unit 102 for discriminating the photographing method at the photographing operation, based on the information of the extracted corresponding points, a combination process unit 103 for appropriately combining the images according to the discriminated photographing method, and a combined image memory 105 for storing the combined images.

Figure 2:
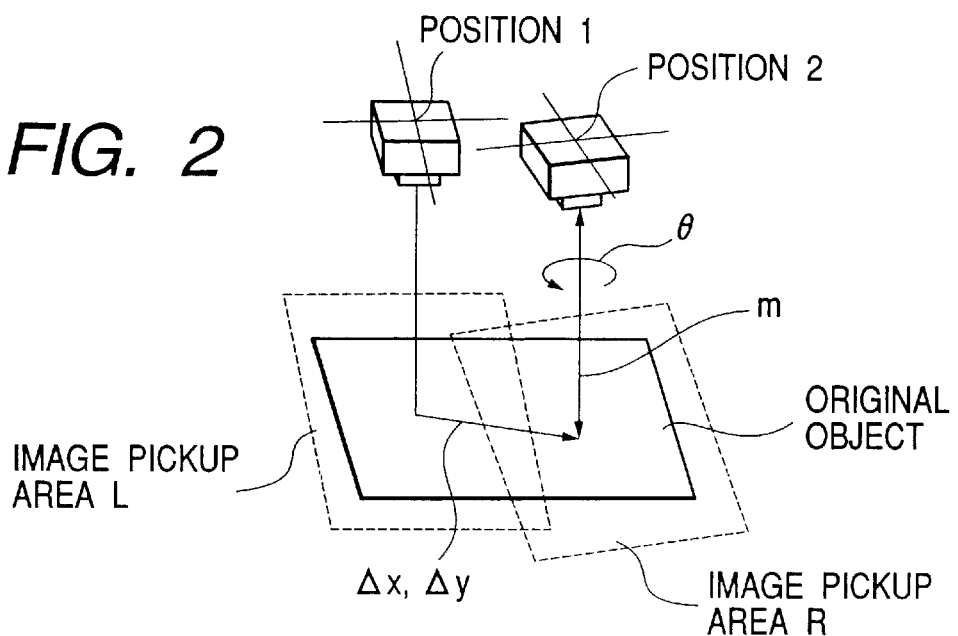
FIG. 2 is a view showing a translation photographing mode in a case of photographing, for example, an original image.

The photographing method discriminated by the photographing method discrimination unit 102 includes, for example, translation photographing, in which the photographs are taken by varying the photographing position without changing the photographing direction, and panning photographing, in which the photographs are taken by varying the photographing direction without changing the photographing position. FIG. 2 shows translation photographing in a case of photographing, for example, original images. After the photographing at a position 1, the camera is moved to a position 2 for photographing again. The movement from the position 1 to position 2 involves changes in the main parameters of translation movement ($\Delta x$, $\Delta y$), rotation ($\theta$) and magnification difference m. Such photographing mode will be called "translation photographing".

Figure 3:
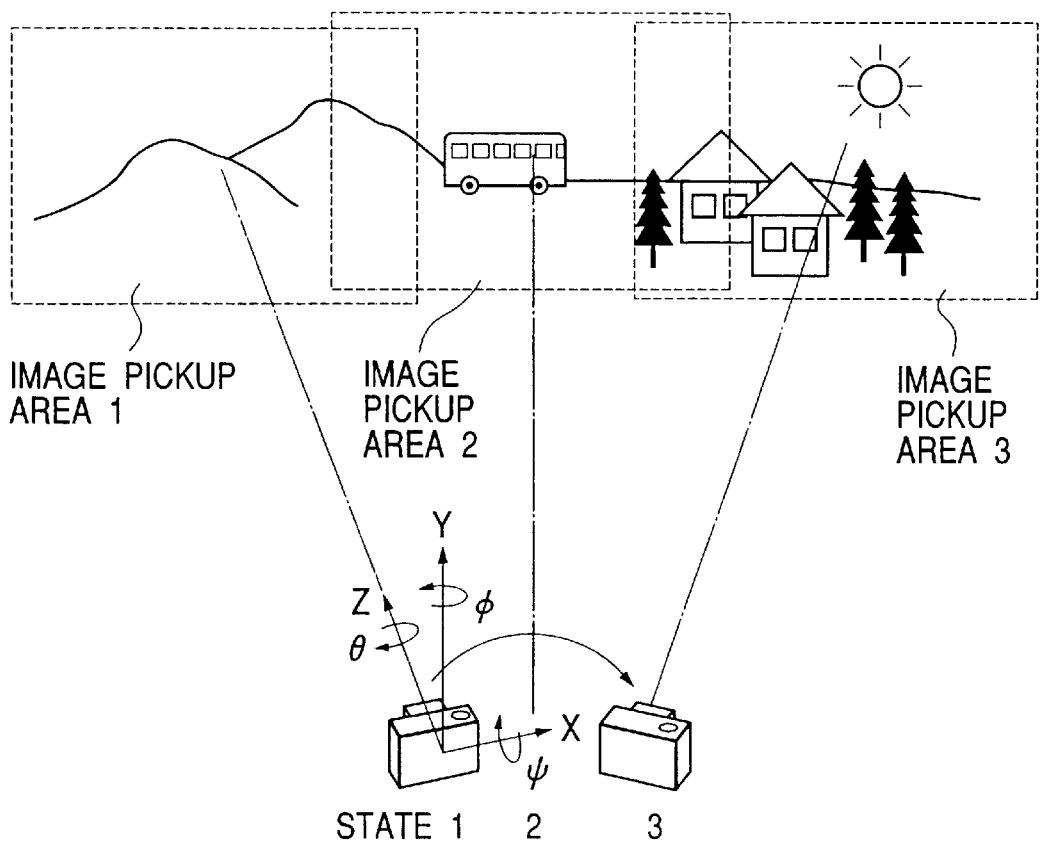
FIG. 3 is a view showing a panning photographing mode in a case of photographing, for example, a landscape.

FIG. 3 shows the panning photographing in case of photographing for example a landscape. The photographing operations are executed with the camera in positions 1, 2 and 3. Main changes involve rotation ($\psi$, $\phi$, $\theta$) about the X-, Y-, and Z-axes. In particular, the rotation $\phi$ about the Y-axis is a governing factor, since the photographing operations are executed in succession while the camera is rotated in the horizontal direction. Such photographing mode will be called "panning photographing".

The photographing method discrimination unit 102 discriminates, in the present embodiment, whether the photographing method is translation photographing or panning photographing.

In the following there will be explained the function of the image combining apparatus of the above-described configuration. FIG. 4 is a flow chart showing the image combining sequence of the image combining apparatus. At first the image input unit 100 enters image data (step S1). The input image data consists of an image photographed with a camera and digitized by A/D conversion, but there may also be entered an image stored in a recording medium or a memory device.

The image entered by the image input unit 100 is temporarily stored in the image memory 104 (step S2). Then there is discriminated whether two images have been entered (step S3). If two images have been entered, the entered two images are used for executing a process of extracting corresponding points (step S4). FIG. 5 schematically shows the corresponding point extracting process. The corresponding points are extracted in the following manner, utilizing the images 200L, 200R in the image memory 104:

1) There is set a template 201 of p×p pixels, with the center at a point P1L on a reference image 200L.
2) A correlation value Zmn is generated according to the following equation (1) at each moved point, while the template 201 is moved within a search area 202 set on a reference image 200R:

$$z_{mn} = \frac{\sum_x \sum_y f_L(x, y) \cdot f_R(x-m, y-n)}{\sqrt{\sum_x \sum_y f_L(x, y)^2} \sqrt{\sum_x \sum_y f_R(x-m, y-n)^2}} \quad (1)$$

wherein $\Sigma_x \Sigma_y$ indicates summation on all the pixels in the template.

3) Correlation values Zmn on the moved points on the reference image 200R are compared to extract a point providing the maximum value.
4) For the point P1L (i, j), the coordinate (i', j') of the corresponding point is given by i'=i−m', j'=j−n', where (m', n') indicates the movement amount providing the maximum correlation value.

The corresponding point extraction unit 101 sets plural templates on the image 200L shown in FIG. 5 and extracts the corresponding point for each template, according to the procedure 1) to 4) explained above. The extracted corresponding points are stored in an unrepresented memory.

Based on the corresponding point information extracted in the step S4, the photographing method discrimination unit 102 discriminates the photographing method (step S5). In the following there will be explained the discrimination of the photographing method.

Figures 6A, 6B:
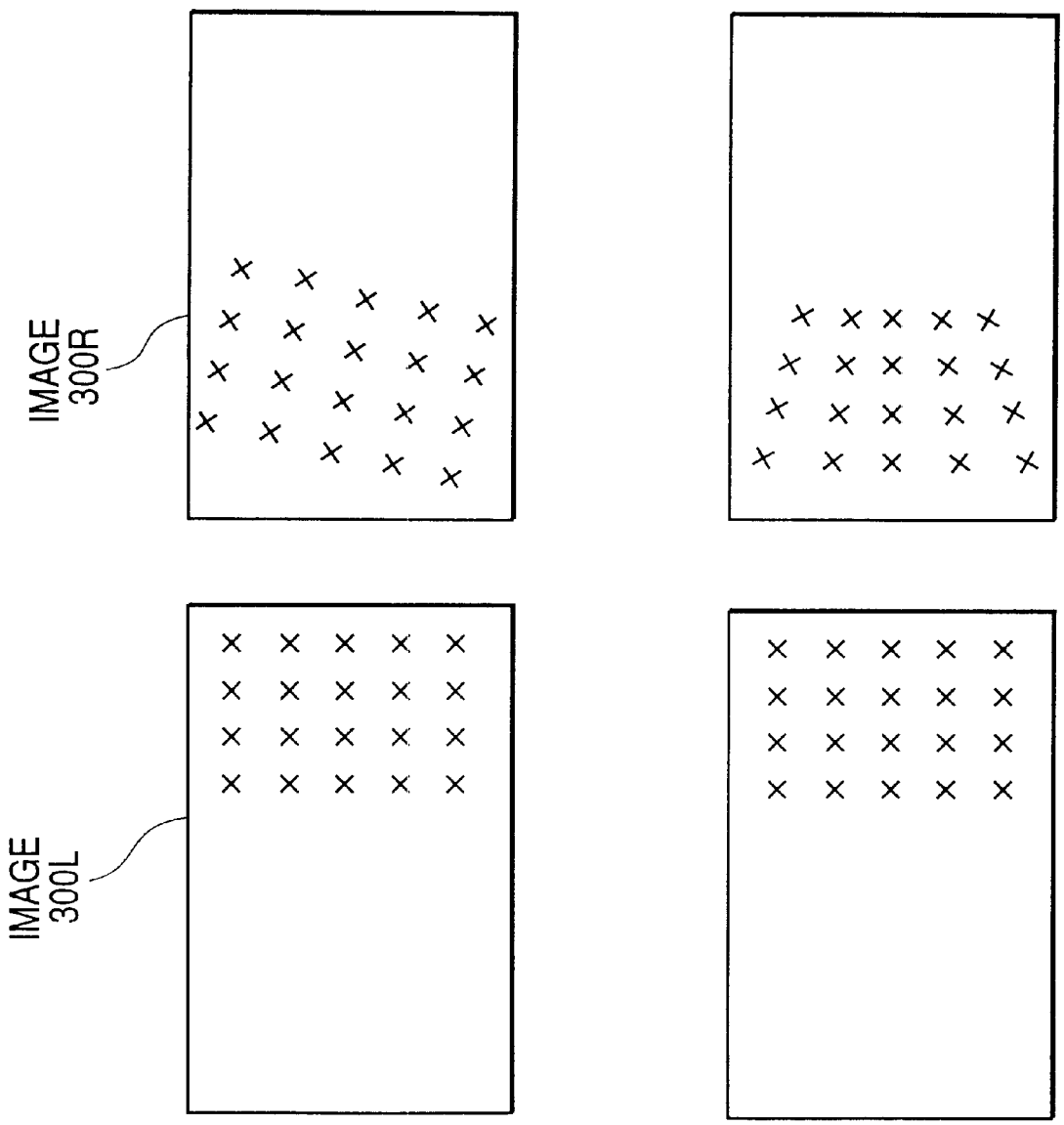
FIGS. 6A and 6B are views schematically showing corresponding points in images obtained in translation photographing and panning photographing.

FIGS. 6A and 6B schematically show the corresponding points between the images obtained by translation photographing and panning photographing. The coordinate relationship between the corresponding points shown in FIG. 6A can be described by affine conversion represented by the following equations (2):

$$x'=Ax+By+C$$
$$y'=Bx+Ay+D \quad (2)$$

where (x, y) are the coordinates on the image 300L in FIG. 6A, while (x', y') are the coordinates on the image 300R. Also the coordinate relationship between the corresponding points shown in FIG. 6B can be described by projection conversion represented by the following equations (3):

$$x' = \frac{m_1 x + m_2 y + m_3}{m_7 x + m_8 y + 1}$$
$$y' = \frac{m_4 x + m_5 y + m_6}{m_7 x + m_8 y + 1} \quad (3)$$

FIG. 7 is a flow chart showing the photographing method discriminating sequence in the photographing method discrimination unit 102. At first the corresponding point information obtained in the corresponding point extraction unit 101 is read from a memory which is not shown (step S11).

The read corresponding points are subjected to calculations by the least square method, based on the conversions represented by the foregoing equations (2) and (3), for calculating a combination error for evaluating the quality of image combination (step S12). The evaluating equation by the least square method is shown in the following. In the case of an affine conversion, there are calculated parameters A, B, C and D for minimizing an error E2 of the following equation (4):

$$E2=\Sigma[\{x'-(Ax+By+C)\}^2+\{y'-(-Bx+Ay+D)\}^2] \quad (4)$$

Also in the case of the projection conversion, there are calculated parameters $m_1$ to $m_8$ for minimizing an error E3 of the following equation (5):

$$E3 = \sum [\{x'(m_7x + m_8y + 1) - (m_1x + m_2y + m_3)\}^2 + \\ \{y'(m_7x + m_8y + 1) - (m_4x + m_5y + m_6)\}^2] \quad (5)$$

The error E2 obtained in the step S12 is compared according to the following relation (6) (step S13):

$$E2 < Th \quad (6)$$

Thus, if the error E2 is smaller than a predetermined threshold value Th, affine conversion, namely the translation photographing method, is identified (step S15). On the other hand, if the error E2 is at least equal to the predetermined threshold value Th, the error E2 is compared with the error E3 according to the following relation (7):

$$E2 \leq E3 \quad (7)$$

Thus, if the error E2 does not exceed the error E3, affine conversion or translation photographing is identified (step S15), but, if the error E3 is smaller than the error E2, there is identified projection conversion, namely panning photographing (step S16). The result of discrimination is given, together with the parameters, to the combination process unit 103.

Figure 8A:
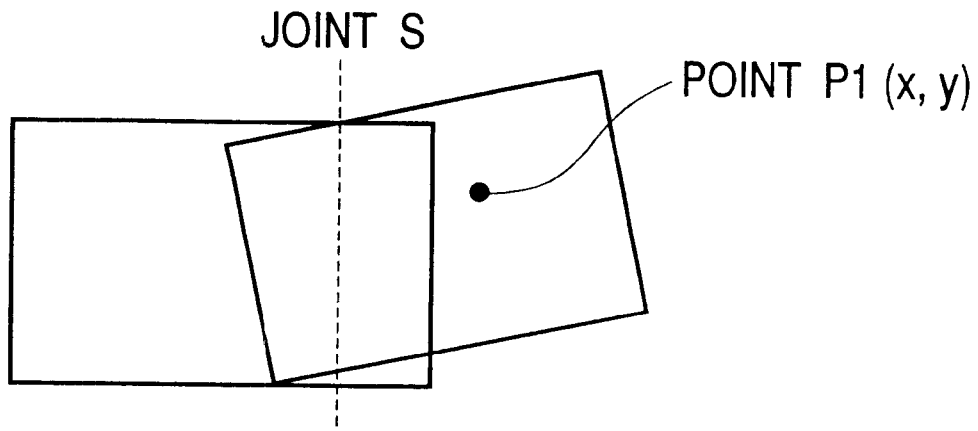
FIGS. 8A and 8B are views showing a combination process by developing a combination image memory 105.
Figure 8B:
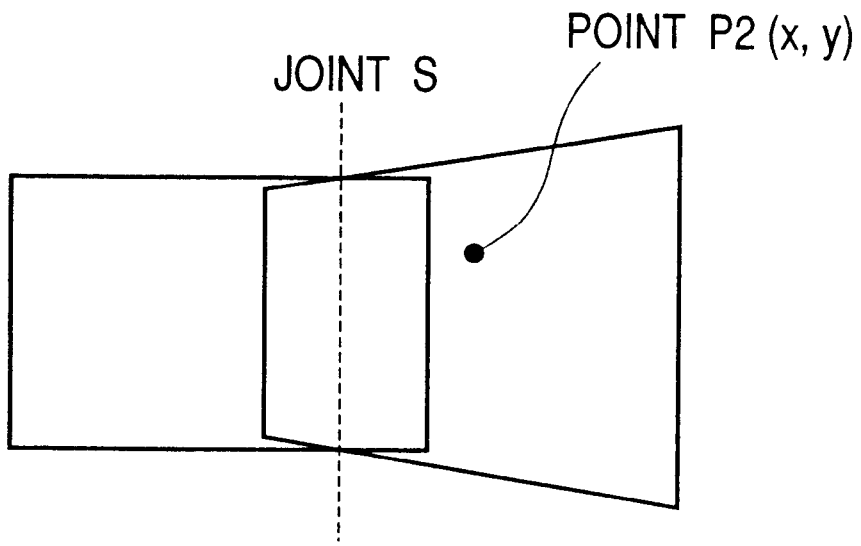

Then a combination process is executed, based on the result of discrimination in step S5 (step S6). FIGS. 8A and 8B illustrate a combination process, showing the development of a combination image memory 105. FIG. 8A shows the combination process in a case where the translation photographing is discriminated, while FIG. 5B shows that in a case where the panning photographing is discriminated.

The combination process unit 103 executes the combination process in the following sequence:

1) A joint position S between the images is set, based on the combination parameters.
2) The image 200L is read from the image memory 104 and the area at the left side of the joint S is written into the combination image memory 105.
3) The area at the right side of the joint S is written into the combination image memory 105, based on the image 200R. The coordinates (x', y') on the image 200R, corresponding to a point P1 (x, y) in FIG. 8A, are calculated by equations (2). Also, the coordinates on the image 200R, corresponding to a point P2 (x, y) in FIG. 8B, are calculated by equations (3).
4) The pixel value at the corresponding coordinate (x', y') on the image 200R is written as the pixel value at the point P1 (x, y) or P2 (x, y). The combination process is executed in this manner.

In a case where the corresponding coordinate value (x', y') in the foregoing sequence step 3) contains a decimal fraction, the pixel value may be generated by a known interpolating process.

Through the sequence S1 to S6 in FIG. 4, the combined image is stored in the combination image memory 105 as shown in FIGS. 8A and 8B.

As the image combination apparatus of the first embodiment discriminates the photographing method solely from the images and executes the optimum combination process according to the result of discrimination, the user need not remember the photographing method and a high-quality combined image can be consistently obtained.

Even when the combination method does not correspond to the photographing method, the image combination is executed by such combination method if the combination error is sufficiently small, and the obtained result is completely acceptable since the appropriate combination method is selected also in such case.

Also, in the generation of the combination parameters, etc., it is possible to calculate the correlation value of the overlapping area by displacing an image by a pixel at a time, or deforming an image, with respect to the other image.

The process time can be reduced by extracting the corresponding points and utilizing the information of such corresponding points, since the calculation becomes simpler.

Figure 9:
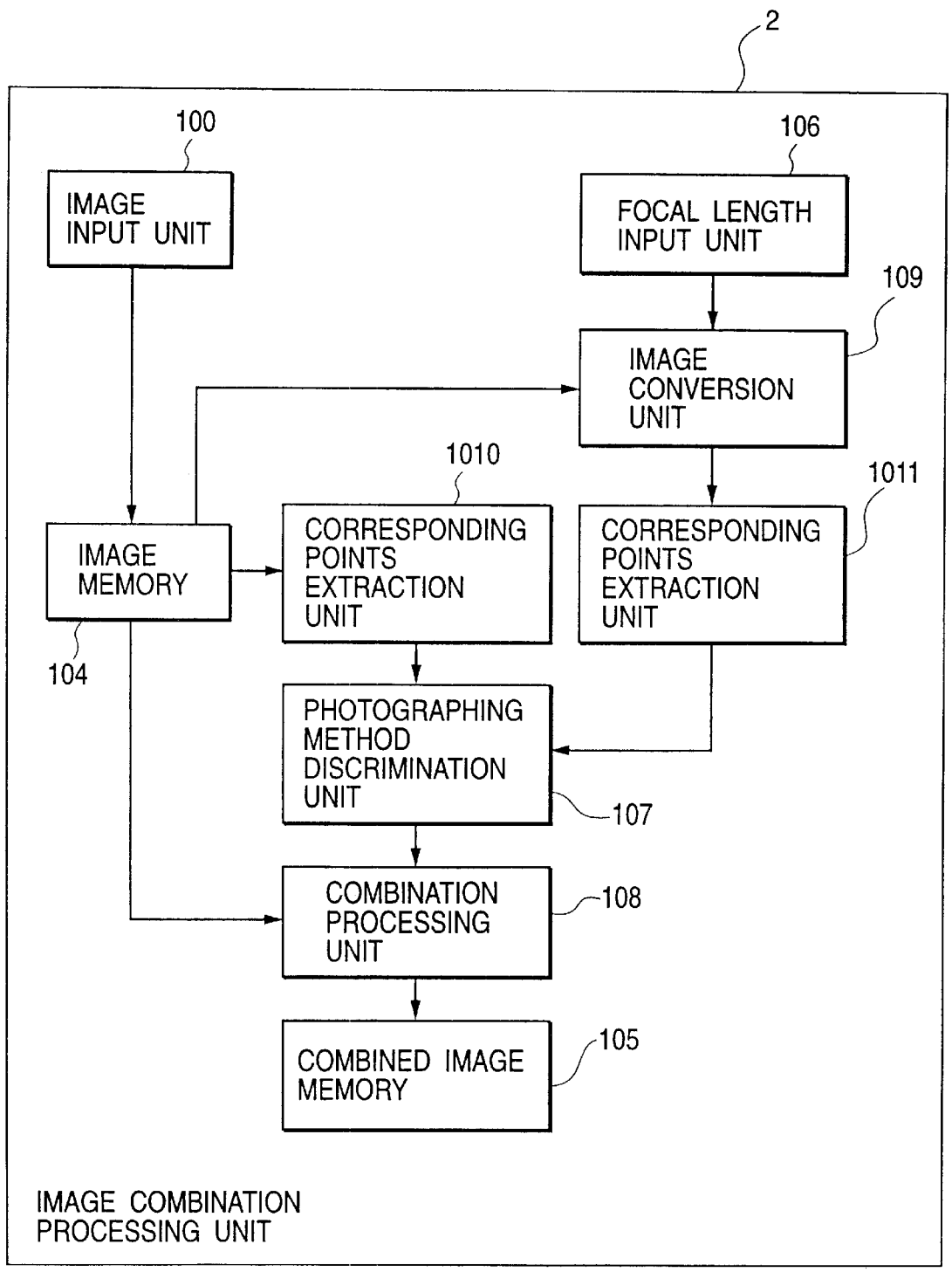
FIG. 9 is a block diagram showing the configuration of an image combination apparatus of a second embodiment.

FIG. 9 is a block diagram of an image combination apparatus of a second embodiment of the present invention, wherein components same as those in the first embodiment are referred to by same numbers and will not be explained further.

The image combination apparatus of the second embodiment, has among other features, a focal length input unit 106, an image conversion unit 109, a photographing method discrimination unit 107 and a combination process unit 108.

The focal length input unit 106 serves to enter the focal length at the photographing operation. The focal length may be entered by the user either by the input of a numerical value through a keyboard or by the selection from plural values, or by recording the focal length information together with the image at the time of the photographing operation followed by the reading of the recorded information by the focal length input unit 106.

The image conversion unit 109 converts the image data utilizing the focal length, based on the cylindrical mapping conversion. Corresponding point extraction units 1010, 1011 extract the corresponding points between the images, according to a process similar to that in the first embodiment.

The photographing method discrimination unit 107 discriminates, as in the first embodiment, whether the photographing method is translation photographing or panning photographing, but the evaluation method employed is different from that of the first embodiment. The combination process unit 108 executes image combination according to the discriminated photographing method.

In the following there will be explained the function of the image combination apparatus of the second embodiment, having the above-described configuration, wherein steps similar to those in the foregoing first embodiment are numbered same and will not be explained further.

Figure 10:
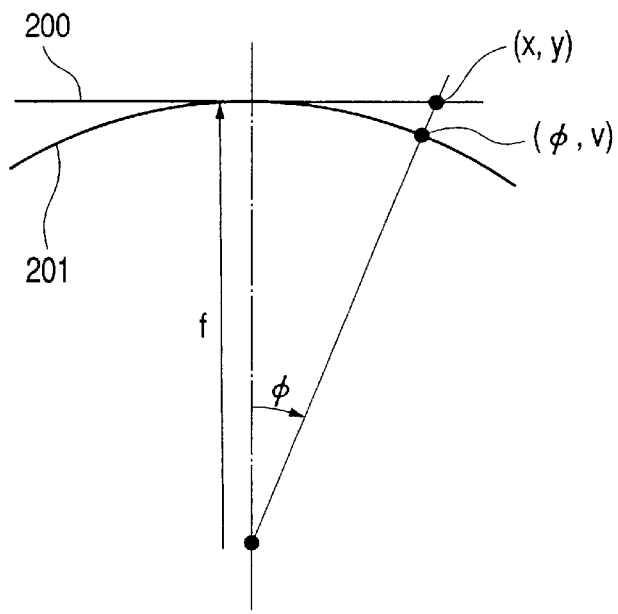
FIG. 10 is a view showing a cylindrical mapping conversion process in an image conversion unit 109.

The image conversion unit 109 executes cylindrical mapping conversion on the image data stored in the image memory 104, based on the focal length obtained by the focal length input unit 106. FIG. 10 shows the cylindrical mapping conversion process in the image conversion unit 109.

In FIG. 10, there are shown an original image 200 read from the image memory 104, and an image 201 after the cylindrical mapping conversion. The coordinate (x, y) before the cylindrical mapping is performed and the coordinate ($\phi$, v) after the cylindrical mapping is performed are correlated by the following equations (8):

$$x = f \tan\phi \quad (8)$$
$$y = \frac{\sqrt{x^2 + f^2}}{f} v$$

Figure 11:
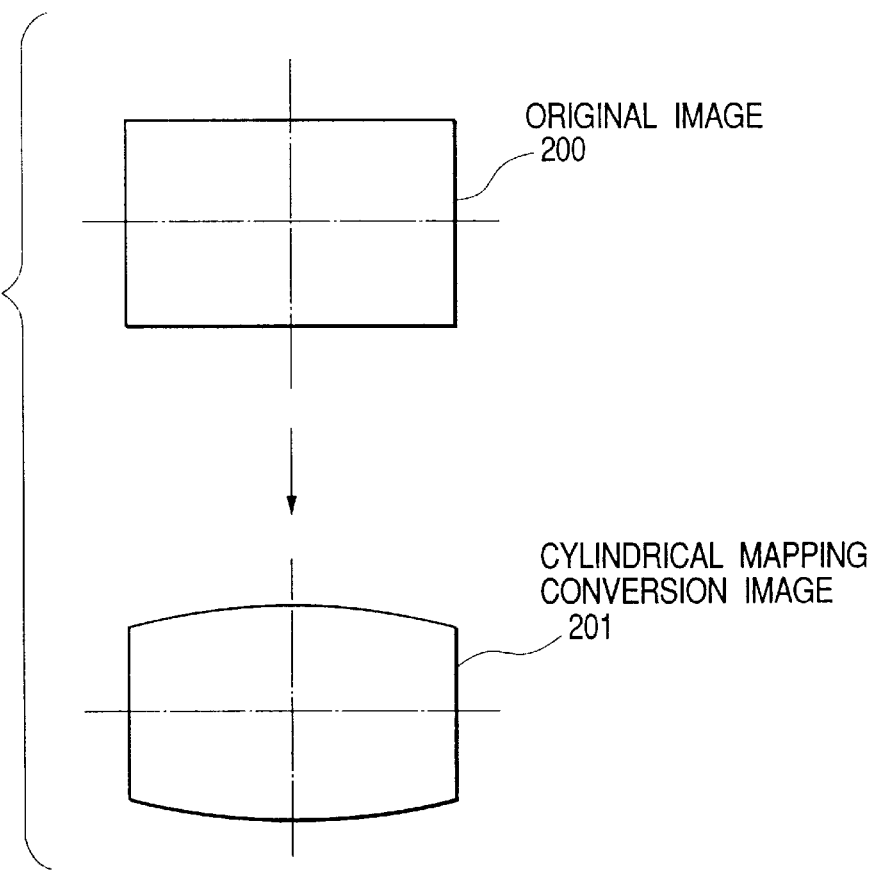
FIG. 11 is a view schematically showing an image after conversion.

The image conversion unit 109 converts the image according to equations (8). FIG. 11 schematically shows the image after conversion. In the image combination process unit 2 of the image combination apparatus of the second embodiment, the corresponding point extraction unit 1010 executes extraction of the corresponding points between the original images, while the corresponding point extraction unit 1011 executes extraction of the corresponding points utilizing the images converted by the cylindrical mapping conversion. Consequently there are generated two sets of paired corresponding points.

The photographing method discrimination unit 107 discriminates the photographing method, utilizing the corresponding point information generated by the corresponding point extraction units 1010, 1011.

Figure 12:
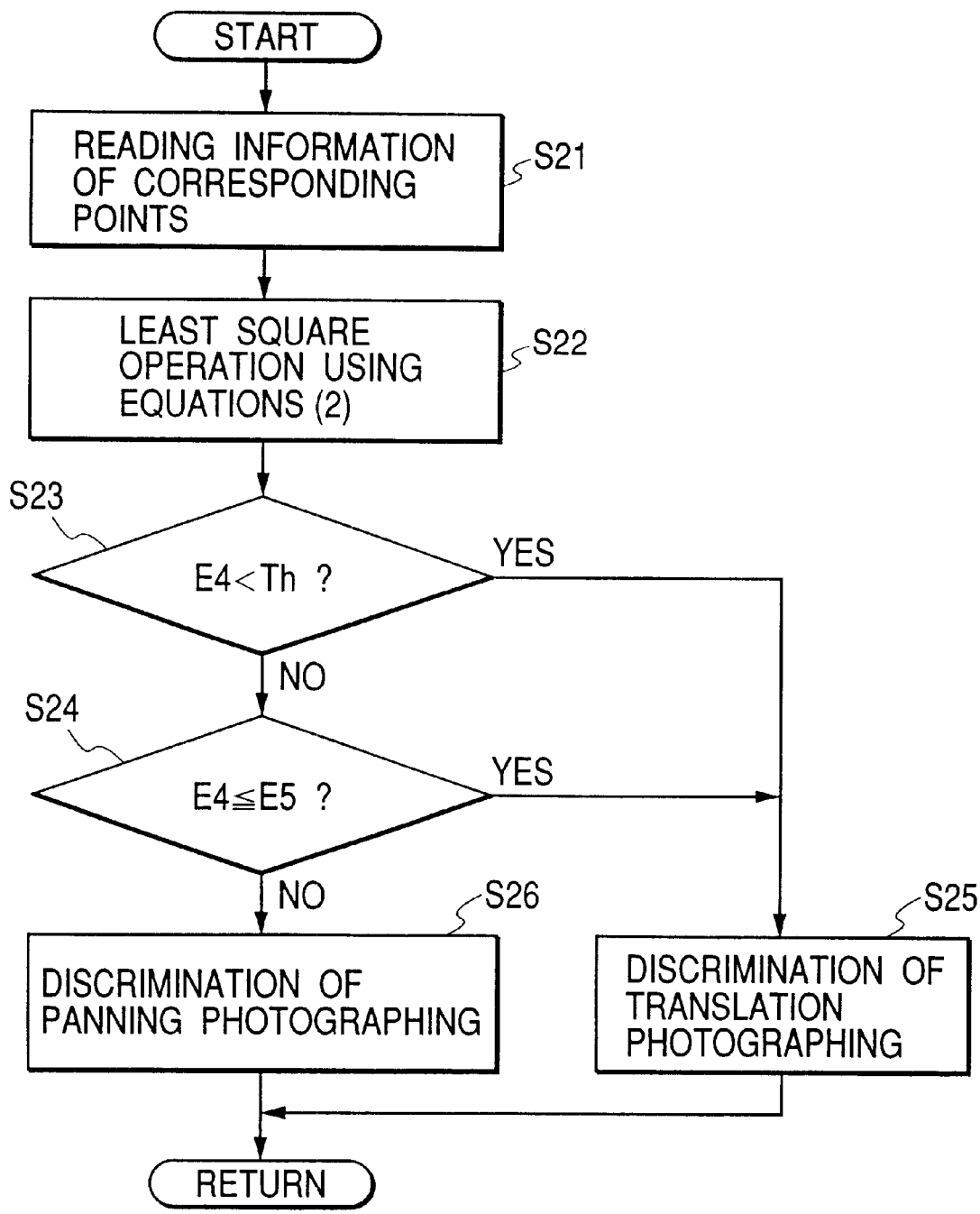
FIG. 12 is a flow chart showing a photographing method discriminating sequence in a photographing method discrimination unit 107.

FIG. 12 is a flow chart showing the photographing method discrimination sequence in the photographing method discrimination unit 107. At first the corresponding point information obtained in the corresponding point extraction units 1010, 1011 is read from a memory which is not shown (step S21).

Thus read corresponding points are used in the calculations by the least square method, based on the foregoing conversion equations (2) (step S22).

The equations (2) alone are employed in order to effect affine coordinate conversion on the image obtained by cylindrical mapping conversion, even in the case of an image taken by panning photographing. Stated differently, an appropriate combination method can be selected by calculating the combination error by the equations (2) on the image subjected to cylindrical mapping conversion and the image not subjected to such cylindrical mapping conversion.

Equations (9) show the evaluation by the least square method. More specifically, there are calculated parameters $A_o$, $B_o$, $C_o$, $D_o$, $A_s$, $B_s$, $C_s$, and $D_s$ minimizing the errors E4, E5 of the equations (9), on the paired corresponding points $(x_o, y_o)$–$(x_o', y_o')$ obtained by the extraction from the original images and those $(x_s, y_s)$–$(x_s', y_s')$ obtained by the extraction from the images subjected to cylindrical mapping conversion:

$$E4 = \sum [\{x_o' - (A_o x_o + B_o y_o + C_o)\}^2 + \{y_o' - (-B_o x_o + A_o y_o + D_o)\}^2] \quad (9)$$

$$E5 = \sum [\{x_s' - (A_s x_s + B_s y_s C_s)\}^2 + \{y_s' - (-B_s x_s + A_s y_s + D)\}^2]$$

Then comparison is made whether the error E4 obtained in the step S22 is smaller than a threshold value Th (E4<Th) (step S23). If the error E4 is smaller than the predetermined threshold value Th, translation photographing is identified, and there is selected a combination method corresponding to the translation photographing (step S25).

If the error E4 is at least equal to the threshold value Th, comparison is made to determine whether the error E4 exceeds the error E5 (E4 5 E5) (step S24). If the error E4 does not exceed the error E5, translation photographing is identified (step S25), but, if the error E5 is smaller than E4, panning photographing is identified (step S26), and, after the selection of a combination method corresponding to the result of such discrimination, the sequence is terminated. The result of discrimination is given, together with the parameters, to the combination process unit 108.

The function of the combination process unit 108 is basically the same as that in the foregoing first embodiment. It is, however, different from the first embodiment in that, in a case where panning photographing is identified, the photographing method discrimination unit 107 reads the original images from the image memory 104, then converts the images by cylindrical mapping conversion by a process similar to that in the image conversion unit 109 and writes the pixel values in the combined image memory 105 utilizing the abovementioned parameters $A_s$, $B_s$, $C_s$, and $D_s$.

Figure 13:
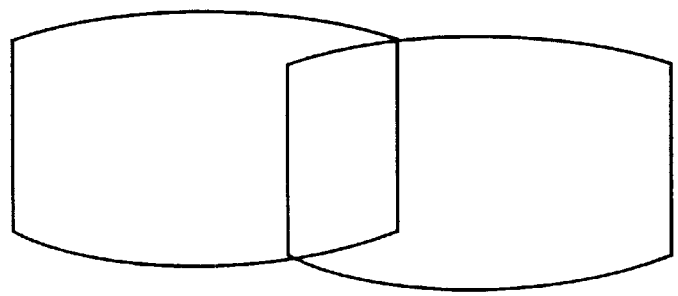
FIG. 13 is a view showing a combined image in a case where panning photographing is identified.

FIG. 13 shows a combined image in a case where panning photographing is identified. The cylindrical mapping conversion is executed again at the time of the image combination, but it is also possible that the image conversion unit 109 stores the combined image in the image memory 104 and the combination process unit 108 executes the image combination by reading the stored image after cylindrical mapping conversion.

It is to be noted that a better image may be obtained by the projection conversion as in the first embodiment, if the image angle of the combined image obtained from the panning photographing is not too large.

In such case, the image combining method may be switched according to the image angle, after the discrimination of the panning photographing.

Also, in the panning photographing operation explained in the foregoing, it is assumed that the photographing direction is changed only in one direction (for example, the lateral direction), but, if the photographing direction is changed in two or more directions (for example, the lateral and vertical directions), the known spherical mapping conversion is preferable, and the image combining method may be switched also in such case.

Figure 14:
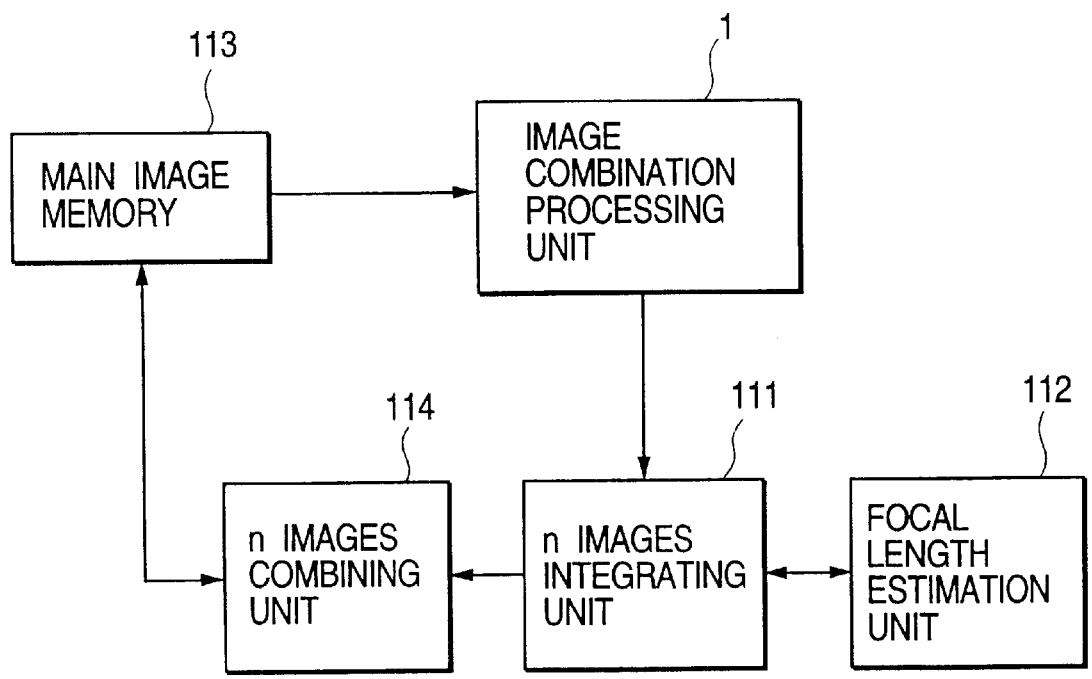
FIG. 14 is a block diagram showing an image combination apparatus of a third embodiment.

FIG. 14 is a block diagram showing the configuration of an image combination apparatus of a third embodiment of the present invention, which is featured in executing a process corresponding to the combination of n images. The image combination process unit 1 in the third embodiment is similar in configuration to that in the first embodiment.

Referring to FIG. 14, an n-image integrating unit 111 generates and retains various information for combining n images. A focal length estimation unit 112 estimates the focal length. Consequently the third embodiment is applicable also in case the focal length is unknown. However, if the focal length is already known, input means may be separately provided for entering the value of the focal length. There are also provided a main image memory 113 for storing information of n images, and an n-image integrating unit 114 for generating a panoramic image by combining n images.

Figure 15:
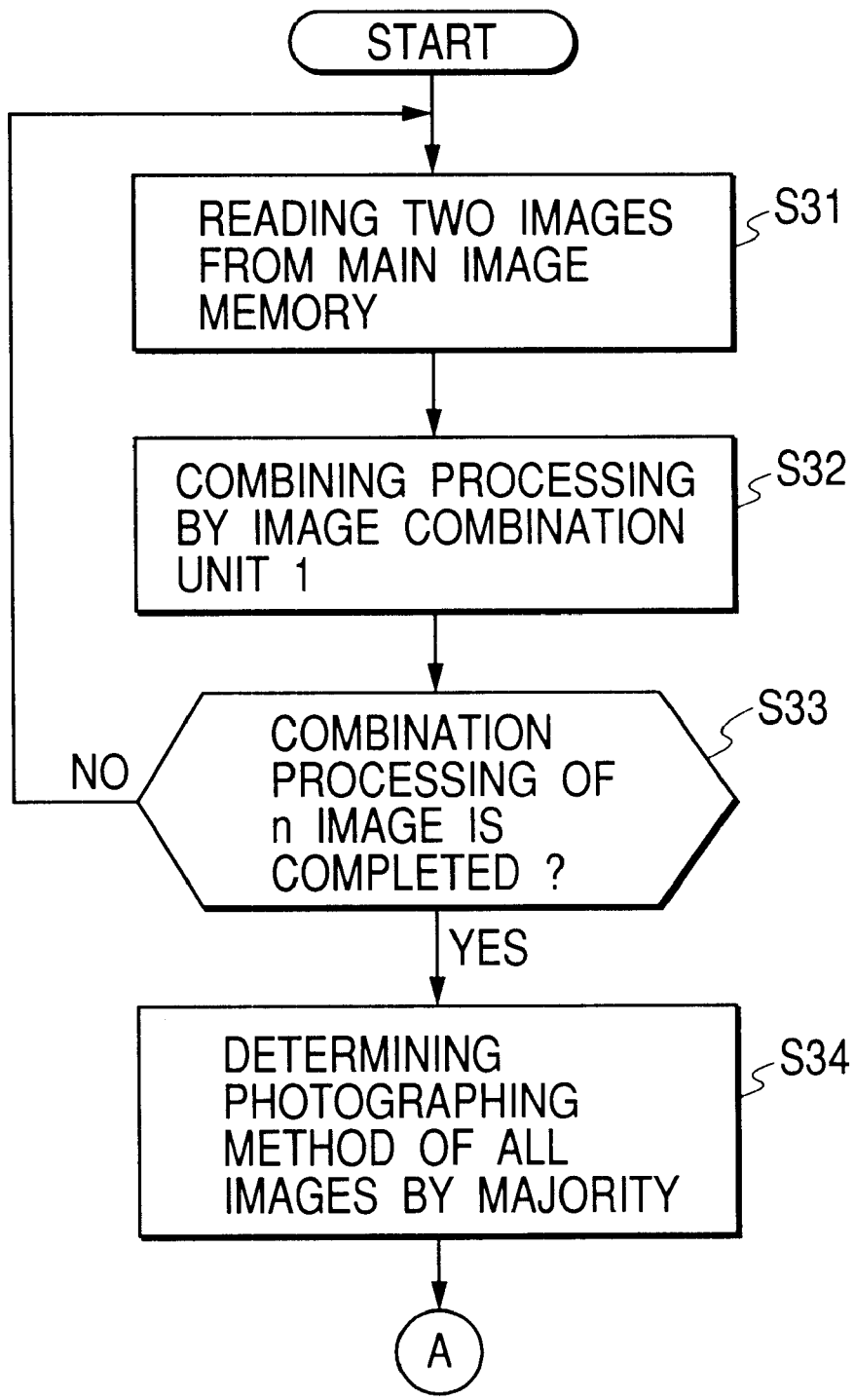
FIGS. 15 and 16 are flow charts showing an image combining sequence in the third embodiment.
Figure 16:
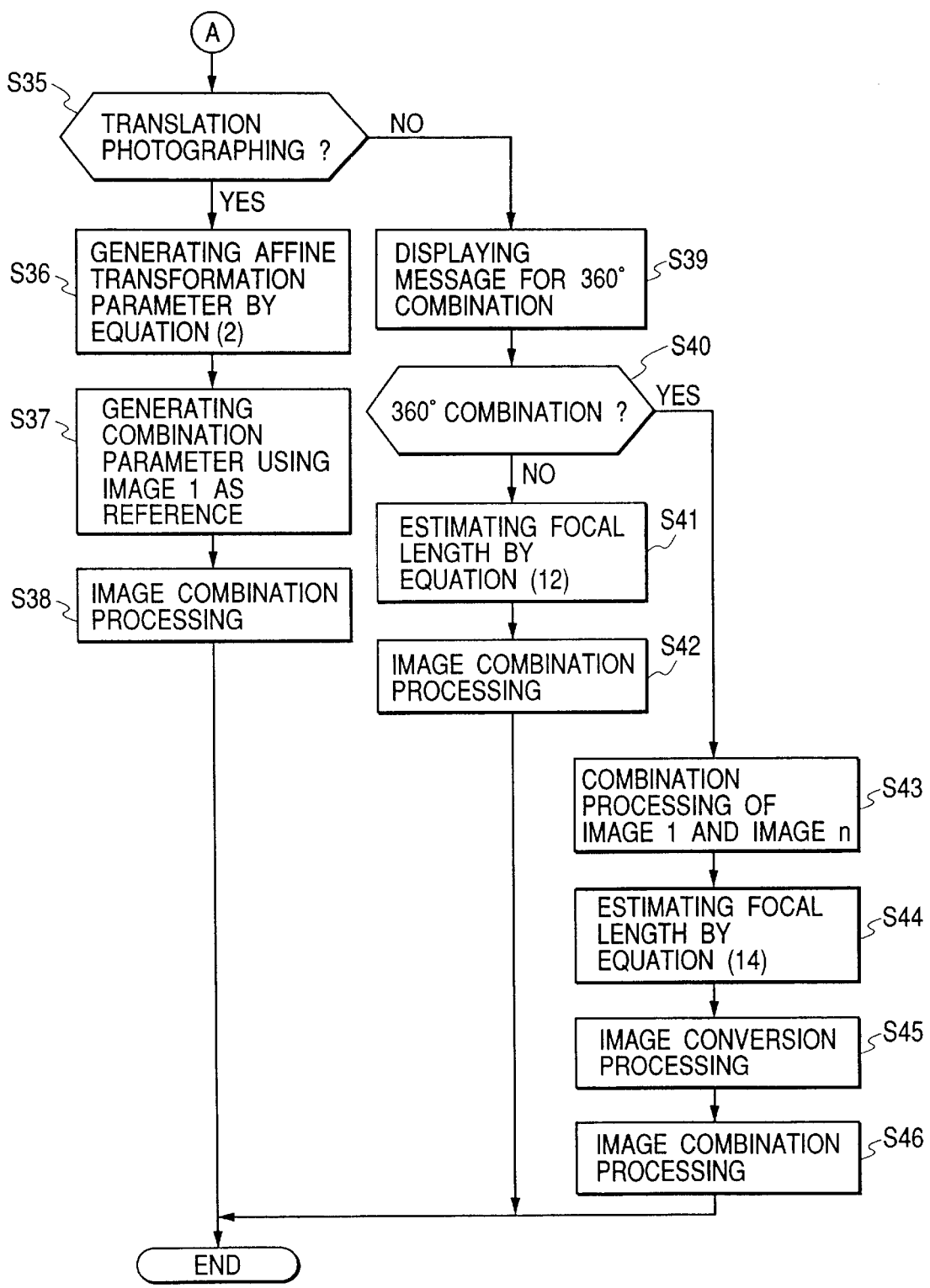

FIGS. 15 and 16 are flow charts showing an image combining sequence in the third embodiment. At first two images are read from the main image memory 113 and supplied into the image combination process unit 1 (step S31). It is assumed that the number of images is stored, by means not shown, in the n-image integrating unit 111.

The image combination process unit 1 combines two images in a process similar to that in the foregoing first embodiment (step S32). The combined image retained in the combined image memory 105 may be displayed by means of a display unit not shown, in order that the user can confirm the result of combination. The coordinate data of the corresponding points between the images, the combining parameters and the information on the photographing method are retained in the n-image integrating unit 111.

Then there is discriminated whether combination of n images has been completed (step S33). If not, the sequence returns to the step S31 to repeat the sequence, but, if completed, the results of (n–1) discriminations, retained in the n-image integrating unit 111, are checked and the photographing method for the n images is determined by majority as the translation photographing or the panning photographing (step S34).

The result of discrimination of the photographing method determined in the step S34 is identified (step S35). More specifically, if translation photographing is discriminated, the information on the corresponding points among the images, retained in the n-image integrating unit 111, is read in succession and the affine conversion parameters $A_i$, $B_i$, $C_i$, and $D_i$ are calculated by the least square method according to the equations (2) (step S36).

Figure 17:
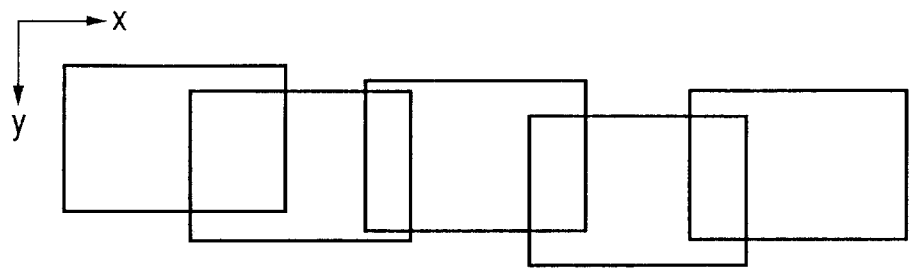
FIG. 17 is a view showing n combined images after parameter conversion.

Then the thus-calculated affine conversion parameters are converted into combination parameters $A_i'$, $B_i'$, $C_i'$, and $D_i'$ based on the image 1 (step S37). FIG. 17 shows the combination of n images after the conversion of the combination parameters.

The n-image combination unit 114 uses the converted combination parameters Ai', Bi', Ci', and Di' to generate the pixel value of each point based on the coordinate conversion of the equations (2) and stores such pixel values in the main image memory 113 (step S38). The method of generating the pixel value is similar to that in the foregoing first embodiment.

On the other hand, if the step S35 discriminates panning photographing, there is displayed, on a display unit not shown, a message for confirming a 360° combination (step S39), and there is discriminated whether 360° combination is instructed (step S40). If 360° combination is not instructed, the focal length estimation unit 112 estimates the focal length in the following manner (step S41).

As shown in FIG. 3, the panning photographing operation is executed by changing the viewing field by the rotation ($\psi$, $\phi$, $\theta$) about the X-, Y-, and Z-axes. Consequently, for converting the coordinates between the images, there is given a matrix M represented as (10):

$$M = FRF^{-1} \quad (10)$$

wherein:

$$R = \begin{bmatrix} \cos\psi\cos\phi & \sin\psi\cos\theta + \cos\psi\sin\phi\sin\theta & \sin\psi\sin\theta - \cos\psi\sin\phi\cos\theta \\ -\sin\psi\cos\phi & \cos\psi\cos\theta - \sin\psi\sin\phi\sin\theta & \cos\psi\sin\theta + \sin\psi\sin\phi\cos\theta \\ \sin\phi & -\cos\phi\sin\theta & \cos\phi\cos\theta \end{bmatrix}$$

$$F = \begin{bmatrix} 1 & 0 & 0 \\ 0 & 1 & 0 \\ 0 & 0 & 1/f \end{bmatrix}$$

According to the equations (3), the coordinate conversion matrix can be represented as (11):

$$M = \begin{bmatrix} m_1 & m_2 & m_3 \\ m_4 & m_5 & m_6 \\ m_7 & m_8 & 1 \end{bmatrix} \quad (11)$$

From the equations (10) and (11), there is derived a relation represented by the equation (12):

$$f = \sqrt{\frac{m_1^2 + m_4^2 - m_2^2 - m_5^2}{m_8^2 - m_7^2}}, \quad m_8 \neq m_7 \quad (12)$$

or $$f = \sqrt{\frac{-m_1 m_2 - m_4 m_5}{m_6 m_7}}, \quad m_6 \neq 0, m_7 \neq 0$$

Consequently, the focal length estimation unit 112 estimates the focal length by the equation (12), utilizing, as the parameters $m_1$ to $m_7$, those stored in the n-image integrating unit 111 corresponding to the panning photographing. As there are plural sets of parameters, there is employed the center value of the focal lengths $f_k$ obtained from such parameters. The estimated focal length f is retained in the n-image integrating unit 111.

The n-image combining unit 114 generates a combined image, utilizing the generated parameter f (step S42). As in the second embodiment, the combined image is subjected to a cylindrical mapping conversion to generate a combined image of n images as shown in FIG. 13, and the combined image is written into the main image memory 113.

On the other hand, if the step S40 identifies 360° combination, there is executed estimation of the coordinate conversion parameters between the first and n-th images, since they mutually overlap (step S43). This operation can be achieved by reading the first and n-th images from the main image memory 113 and executing the aforementioned process in the combined image process unit 1. The information such as the generated parameters is stored in the n-image integrating unit 111.

Figure 18:
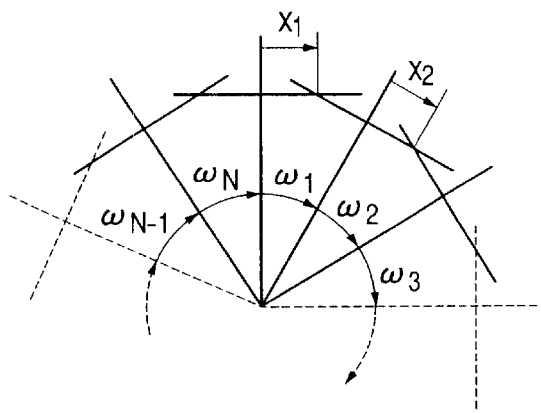
FIG. 18 is a view showing the viewing angles in the respective images.
Figure 19:
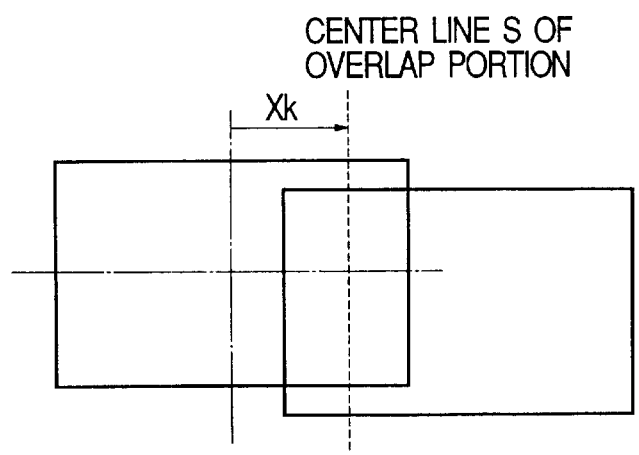
FIG. 19 is a view showing a center line S of the overlapping area of images.

The focal length estimation unit 112 estimates the focal length (step S44). FIG. 18 shows the viewing angle $\omega_k$ in each image, which is obtained from the following equation (13):

$$\omega_k = \tan^{-1}(x_k/f) \quad (13)$$

wherein $x_k$ is obtained by determining the center line S of the overlapping area between the images, as shown in FIG. 19. The n-image integrating unit 111 determines $x_k$ by calculating the overlapping area between the images based on the coordinate conversion parameters.

Since the viewing angle of 360° is covered by n images, the sum of $\omega_1$ to $\omega_n$ becomes 360° ($2\pi$), and this relationship is represented by the equation (14):

$$2\pi - \Sigma\{(2 \tan^{-1}(x_k/f)\} = 0 \quad (14)$$

The focal length is estimated by solving equation (14) for example by the Newton method. The estimated focal length is stored in the n-image integrating unit 111. Also the n-image integrating unit 111 executes cylindrical mapping conversion of the coordinates of the corresponding points between the images, based on the focal length f, and generates parameters according to the equations (2), utilizing the thus-converted coordinates of the corresponding points. The generated parameters are further converted into values based on a reference image (for example, image 1) for use in the combination of all the images).

In this manner the focal length f can be automatically obtained, also in the second embodiment, solely from the image information.

Figure 20:
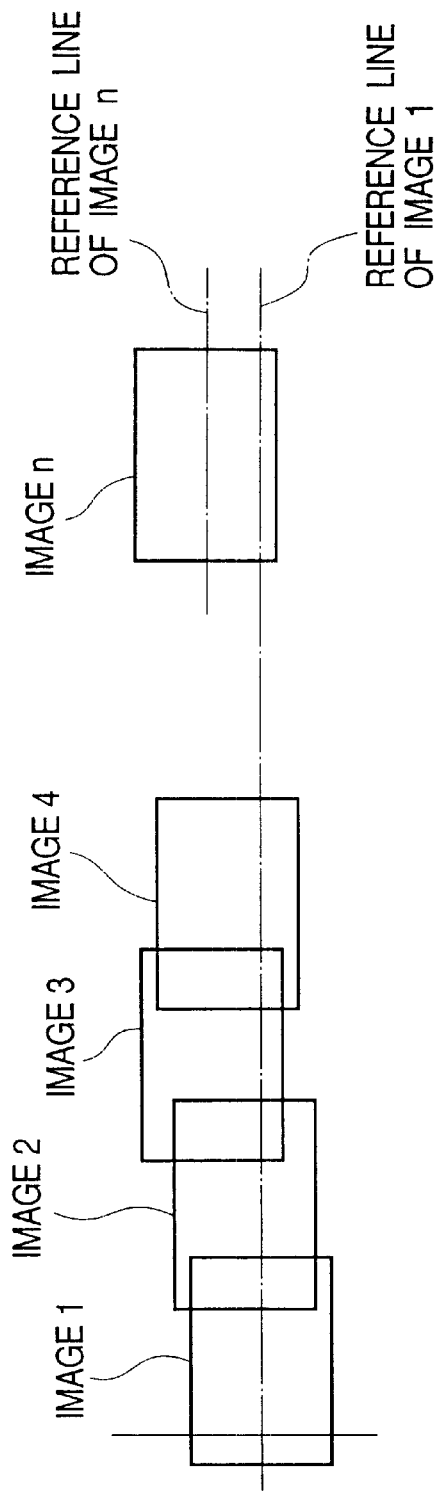
FIG. 20 is a view showing combined images prior to conversion process.

Then there is executed a conversion process for providing a smooth joint between the first and n-th images as a result of 360° combination (step S45). FIG. 20 shows the combined image after such conversion process. Without the conversion process, the reference lines set respectively in the first and n-th images are mutually displaced.

Figure 21:
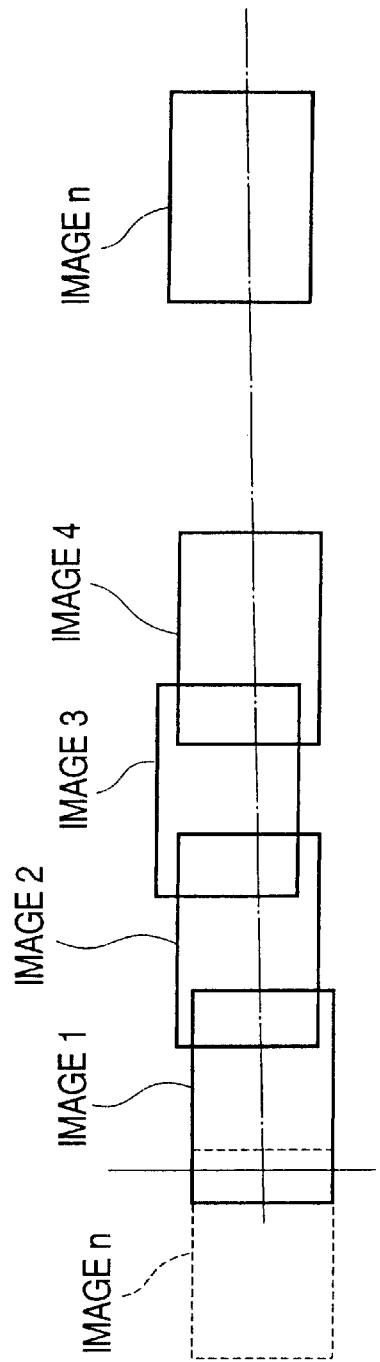
FIG. 21 is a view showing combined images after conversion process.
Figure 22:
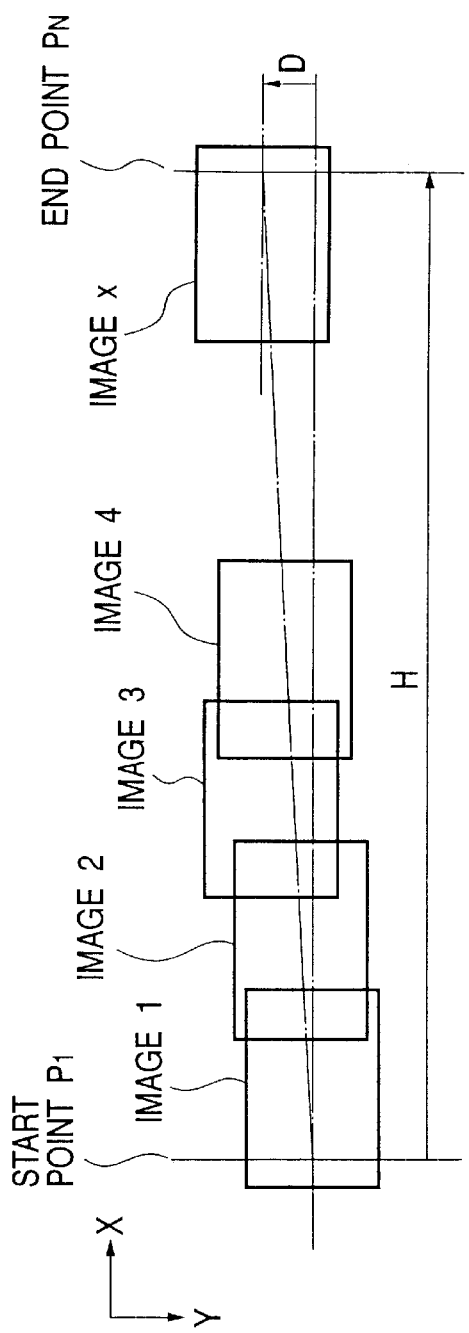
FIG. 22 is a view schematically showing the conversion process.

FIG. 21 shows the combined image after such conversion process, wherein the reference lines respectively set in the first and n-th images mutually coincide. FIG. 22 schematically shows the conversion process.

As shown in FIG. 22, a start point $P_1$ and an end point $P_N$ of the entire circumference are set, and the images are so converted that the reference lines of the images 1 and n mutually coincide at the point $P_N$. In the illustrated case, the reference lines have a mutually aberration D at the point $P_N$, while H pixels are present between the start point $P_1$ and the end point $P_N$, so that the write-in coordinate in the vertical direction is shifted by a value dv(x), given by the following equation (15), taking the start point $P_1$ as the start point of the combined image in the horizontal direction:

$$dv(x) = \frac{D}{H}x \quad (15)$$

The n-image integrating unit 111 generates and retains the coefficient D/H in the equation (15), and the n-image combining unit 114 generates the combined image (step S46). In this operation, it generates the pixel values of the combined image by executing the cylindrical mapping conversion according to the equations (8) and the conversion according to the equation (15) and stores the generated pixel value in the main image memory 113.

The aberration in the image can thus be made inconspicuous, by distorting the entire image with a constant rate in the panning direction.

Figure 23:
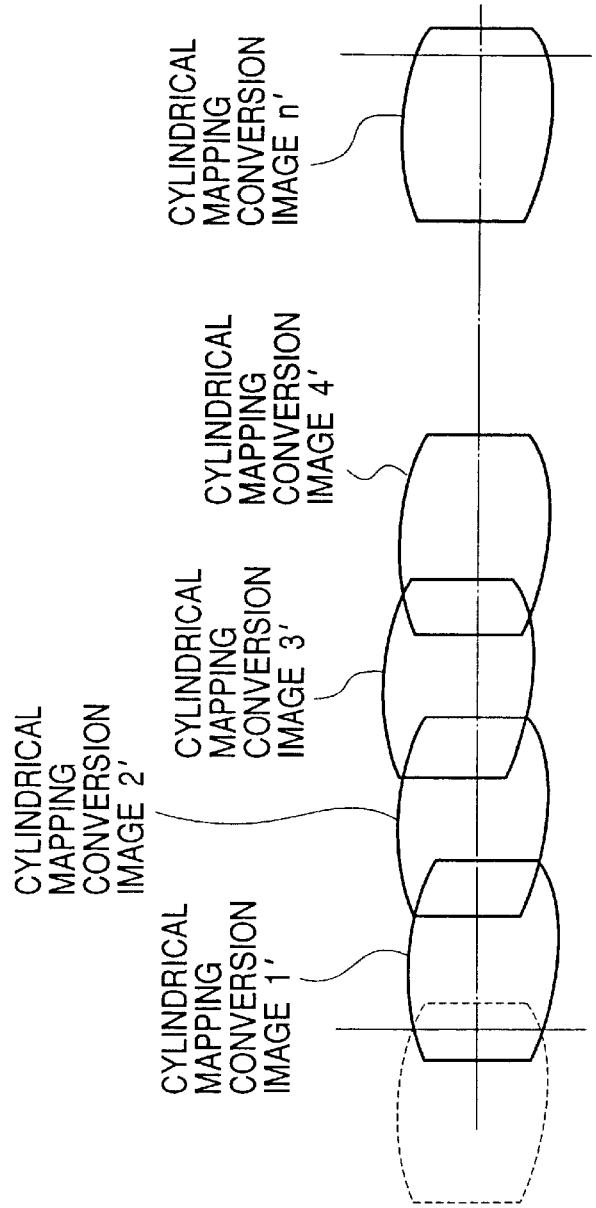
FIG. 23 is a view schematically showing generated combined images.
Figure 24:
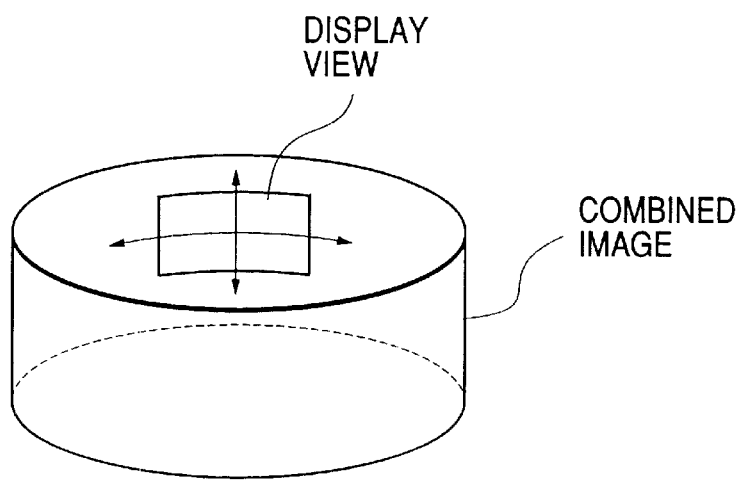
FIG. 24 is a view showing generation of an image by 360° cylindrical mapping.

FIG. 23 schematically shows the combined image thus generated, which is displayed on display unit not shown. The above-described process allows to generate an automatically mapped cylindrical image free from aberration over the entire circumference of 360°. FIG. 24 shows the generation of the cylindrical image, mapped over the entire circumference of 360°.

Figure 25:
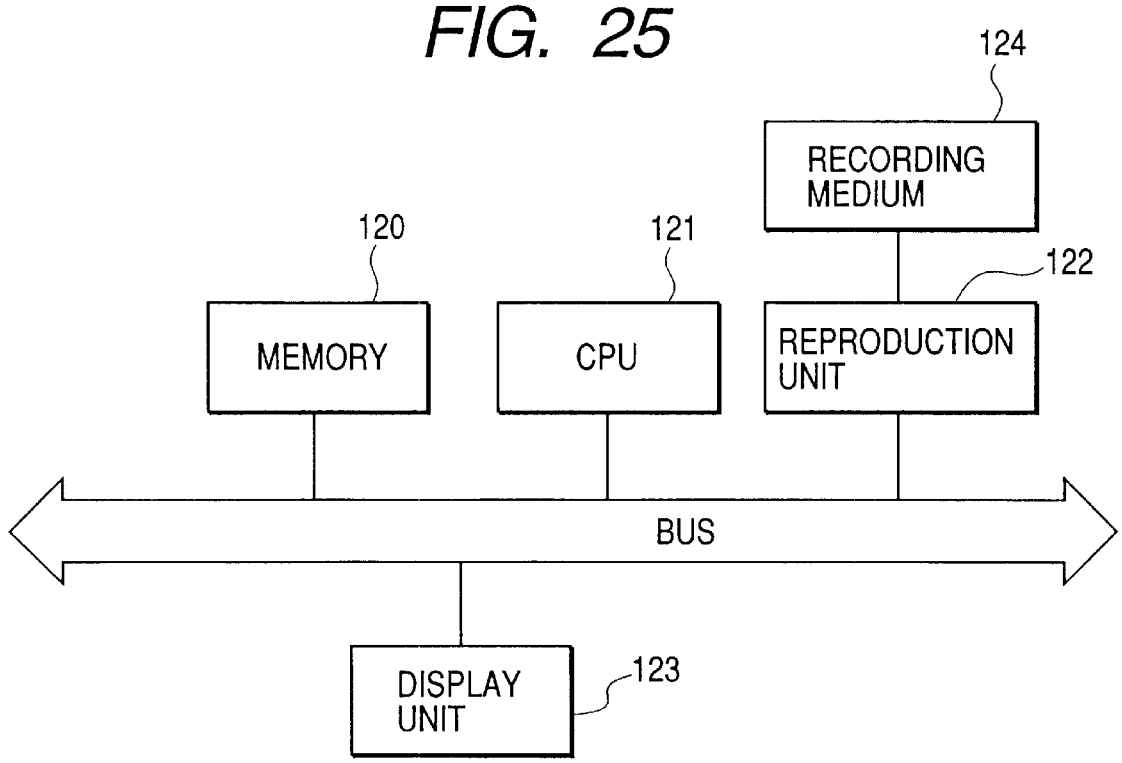
FIG. 25 is a block diagram of a computer system realizing an image combining apparatus of a fourth embodiment.

FIG. 25 is a block diagram showing a computer system realizing an image combination apparatus of a fourth embodiment of the present invention. In the fourth embodiment, a program embodying the image combination process of the foregoing first embodiment is recorded on a recording medium and is rendered operable on the computer system.

In FIG. 25, there are shown a memory 120 for storing various data, a CPU 121, a reproduction unit 122 for reproducing the information of a recording medium, a display unit 123, and a recording medium 124.

Figure 26:
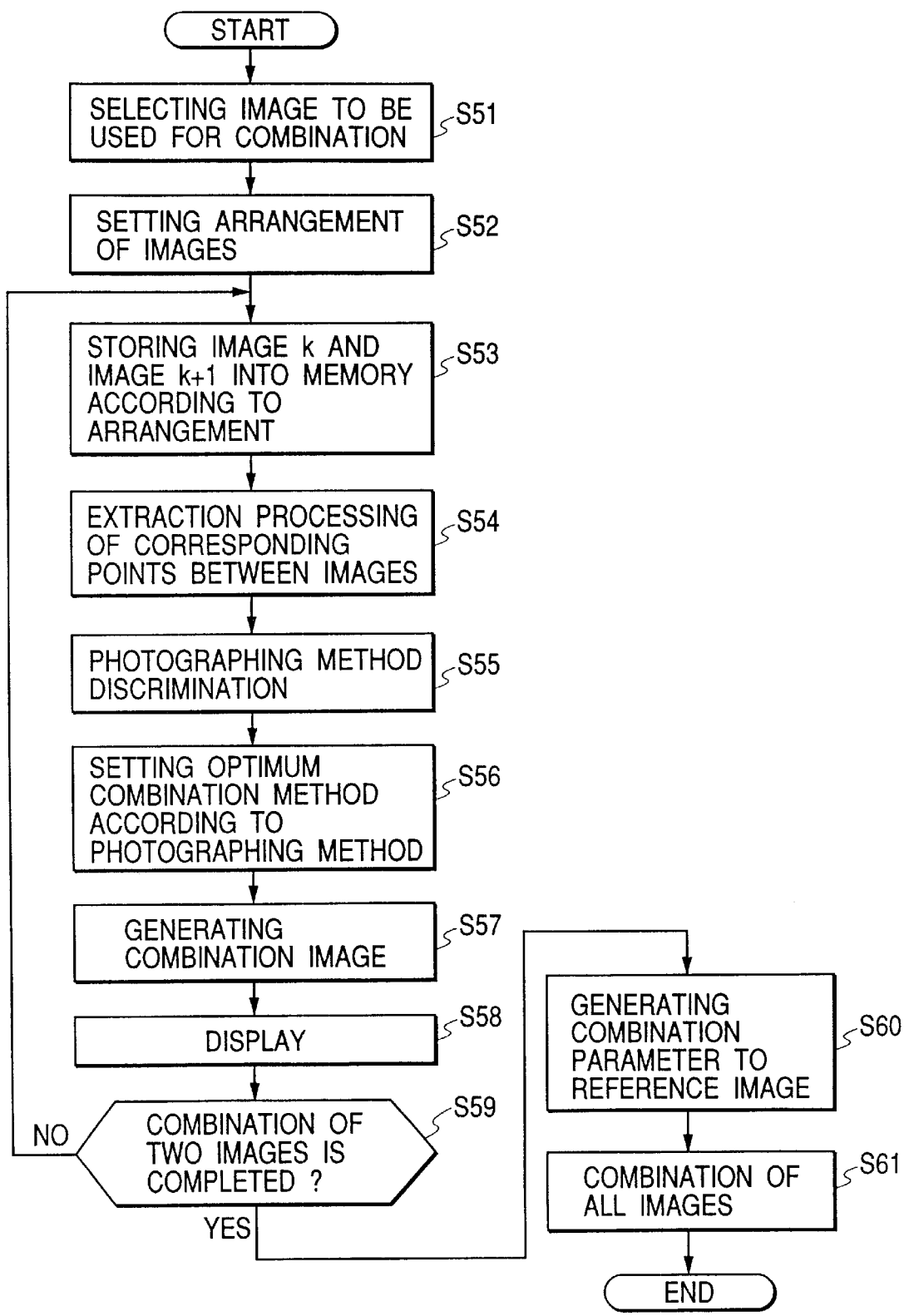
FIG. 26 is a flow chart showing an image combining sequence in the fourth embodiment.

FIG. 26 is a flow chart showing the image combination sequence in the fourth embodiment. A corresponding program is stored in the recording medium 124 and is executed by the CPU 121. At first the user selects images to be used in combination (step S51), and the user sets the arrangement of the images (step S52). Based on such arrangement, two neighboring images are read into the memory 120 (step S53).

From the thus-read images, corresponding points are extracted (step S54), and the photographing method is discriminated from the information of the corresponding points (step S55). Based on the discriminated photographing method, an optimum combining method is set and the combination parameters are generated (step S56).

Two images are combined utilizing the combination parameters (step S57), and the combined image is displayed (step S58). Then a discrimination is made as to whether the combinations of the neighboring two images have been completed (step S59).

If not, the sequence returns to the step S53 to repeat the combination of two images, but, if completed, the parameters are converted into values relative to the reference image. All the images are combined, based on the thus-converted combination parameters (step S61). The process in each step is similar to that explained in the foregoing embodiments.

The recording medium can be composed not only of a memory element such as a ROM but also of any other memory device such as a floppy disk, a hard disk, an optical disk, a magneto-optical disk, a CD-ROM, a CD-R, a DVD, a magnetic tape or a non-volatile memory card.

Many widely different embodiments of the present invention may be constructed without departing from the spirit and scope of the present invention. It should be understood that the present invention is not limited to the specific embodiments described in the specification, except as defined in the appended claims.

What is claimed is:

1. An image processing method comprising:
an input step, of entering plural images; and
a selection step, of selecting one of plural image combining methods including different respective mapping conversion surfaces, utilizing a relationship between the plural images, wherein said selection step includes an evaluation step, of evaluating image combination results based on the plural image combining methods, respectively, and said selection step includes selecting at least one of the plural image combining methods according to the result of the evaluation.

2. An image processing method according to claim 1, further comprising:
an extraction step, of extracting corresponding points on an overlapping area of the plural images.

3. An image processing method according to claim 2, wherein said evaluation step includes calculating a combination error generated in case of image combination based on the corresponding points and wherein said selection step includes evaluating the image combining method by comparing the combination error with a predetermined value.

4. An image processing method according to claim 2, wherein said evaluation step includes calculating combination errors generated in case of image combinations respectively by at least two image combining methods based on the corresponding points and wherein said selection step includes evaluating the image combining method by comparing the magnitude of the combination errors.

5. An image processing method according to claim 1, wherein the plural image combining methods at least include those corresponding to a translation photographing method, in which images are taken with a change in the photographing position but without a change in the photographing direction, and a panning photographing method, in which images are taken with a change in the photographing direction but with a change in the photographing position.

6. An image processing method according to claim 5, wherein the image combining method corresponding to the panning photographing method utilizes images obtained by coordinate conversion from the plural images onto a virtual cylindrical plane or a virtual spherical plane having a radius equal to the photographing focal length.

7. An image processing method according to claim 5, wherein the image combining method corresponding to the panning photographing method includes a correction step, in which in a case of generating a 360° panoramic image, is corrected the image aberration generated in the 360° panoramic image generated by combining the both ends of the combined image, by distorting the entity of the combined image.

8. An image processing method according to claim 1, wherein said selection step includes selecting whether or not to perform mapping conversion.

9. An image processing method according to claim 1, wherein the different mapping conversion methods include at least projection conversion including mapping onto a virtual plane, find cylindrical mapping conversion including mapping onto a virtual cylindrical plane.

10. A recording medium storing a computer readable program for causing a computer to execute a process, said program comprising:

code for an input step, of entering plural images;

code for a selection step, of selecting one of plural image combining methods including different respective mapping conversion surfaces, utilizing a relationship between the plural images; and code for an evaluation step, of evaluating image combination results based on at least one of the plural image combining methods, wherein said selection step includes selecting the image combining method according to the result of the evaluation.

11. A recording medium according to claim 10, wherein said program further comprises code for an extraction step, of extracting corresponding points on an overlapping area of the plural images.

12. A recording medium according to claim 11, wherein said evaluation step includes calculating a combination error generated in case of image combination based on the corresponding points and wherein said selection step includes evaluating the image combining method by comparing the combination error with a predetermined value.

13. A recording medium according to claim 11, wherein said evaluation step includes calculating combination errors generated in case of image combinations respectively by at least two image combining methods based on the corresponding points and wherein said selection step includes evaluating the image combining method by comparing the magnitude of the combination errors.

14. A recording medium according to claim 10, wherein the plural image combining methods at least include those corresponding to a translation photographing method, in which images are taken with a change in the photographing position but without a change in the photographing direction, and a panning photographing method, in which images are taken with a change in the photographing direction but with a change in the photographing position.

15. A recording medium according to claim 14, wherein the image combining method corresponding to the panning photographing method utilizes images obtained by coordinate conversion from the plural images onto a virtual cylindrical plane or a virtual spherical plane having a radius equal to the photographing focal length.

16. A recording medium according to claim 14, wherein the image combining method corresponding to the panning photographing method includes a correction step, in which a case of generating a 360° panoramic image, is corrected the image aberration generated in the 360° panoramic image generated by combining the both ends of the combined image, by distorting the entity of the combined image.

17. A recording medium according to claim 10, wherein said selection step includes selecting whether or not to perform mapping conversion.

18. A recording medium according to claim 10, wherein the different mapping conversion methods include at least projection conversion including mapping onto a virtual plane, and cylindrical mapping conversion including mapping onto a virtual cylindrical plane.

19. An image processing apparatus comprising:

input means for entering plural images;

selection means for selecting one of plural image combining methods including different respective mapping conversion surfaces, utilizing a relationship between the plural images; and evaluation means for evaluating image combination results based on at least one of the plural image combining methods, wherein said selection means selects the image combining method according to the result of the evaluation.

20. An image processing apparatus according to claim 19, further comprising:

extraction means for extracting corresponding points on an overlapping area of the plural images.

21. An image processing apparatus according to claim 20, wherein said evaluation means is adapted to calculate a combination error generated in case of image combination based on the corresponding points and wherein said selection means is adapted to evaluate the image combining method by comparing the combination error with a predetermined value.

22. An image processing apparatus according to claim 20, wherein said evaluation means is adapted to calculate combination errors generated in case of image combinations respectively by at least two image combining methods based on the corresponding points and wherein said selection means is adapted to evaluate the image combining method by comparing the magnitude of the combination errors.

23. An image processing apparatus according to claim 19, wherein the plural image combining methods at least include those corresponding to a translation photographing method, in which images are taken with a change in the photographing position but without a change in the photographing direction, and a panning photographing method, in which images are taken with a change in the photographing direction but with a change in the photographing position.

24. An image processing apparatus according to claim 23, wherein the image combining method corresponding to the panning photographing method utilizes images obtained by coordinate conversion from the plural images onto a virtual cylindrical plane or a virtual spherical plane having a radius equal to the photographing focal length.

25. An image processing apparatus according to claim 23, wherein the image combining method corresponding to the panning photographing method includes correction means adapted, in case of generating a 360° panoramic image, to correct the image aberration generated in the 360° panoramic image generated by combining the both ends of the combined image, by distorting the entity of the combined image.

26. An image processing apparatus according to claim 19, wherein said selection means selects whether or not to perform mapping conversion.

27. An image processing apparatus according to claim 19, wherein the different mapping conversion methods include at least projection conversion including mapping onto a virtual plane, and cylindrical mapping conversion including mapping onto a virtual cylindrical plane.

28. An image processing method comprising:

an input step, of entering plural images;

an extraction step, of extracting corresponding points in an overlapping area of the plural images;

a selection step, of selecting one of a plurality of image combining method including different respective mapping conversion surfaces, on the basis of the corresponding points; and an evaluation step, of evaluating image combination results based on at least one of the plural image combining methods, wherein said selection step includes selecting the image combining method according to the result of the evaluation.

29. An image processing method according to claim 28, wherein the plural image combining methods at least include those corresponding to a translation photographing method in which images are taken with a change in the photographing position but without a change in the photographing direction, and a panning photographing method in which images are taken with a change in the photographing direction but with a change in the photographing position.

30. An image processing method according to claim 28, wherein said evaluation step includes evaluating based on cylindrical mapping conversion or spherical mapping conversion.

31. An image processing method according to claim 28, wherein the image combining method utilizes an affine conversion or a projection conversion.

32. An image processing method according to claim 28, further comprising a correction step, in which in a case of generating a 360° panoramic image, is corrected the image aberration generated in the 360° panoramic image generated by combining the both ends of the combined image, by distorting the entity of the combined image.

33. An image processing method according to claim 28, wherein said selection step includes selecting whether or not to perform mapping conversion.

34. An image processing method according to claim 28, wherein the different mapping conversion methods include at least projection conversion including mapping onto a virtual plane, and cylindrical mapping conversion including mapping onto a virtual cylindrical plane.

* * * * *

UNITED STATES PATENT AND TRADEMARK OFFICE
CERTIFICATE OF CORRECTION

PATENT NO.   : 6,704,041 B2
DATED        : March 9, 2004
INVENTOR(S)  : Tatsushi Katayama et al.

It is certified that error appears in the above-identified patent and that said Letters Patent is hereby corrected as shown below:

Column 1,
Line 31, "other" should read -- some other --.

Column 3,
Line 54, "there is" should read -- it is --.

Column 4,
Line 35, "y'=Bx+Ay+D" should read -- y'=-Bx+Ay+D --.

Column 5,
Line 31, "FIG. 5B" should read -- FIG. 8B --.

Column 10,
Line 66, "mutually aberration" should read -- mutual aberration --.

Column 11,
Line 20, "display" should read -- the display --.

Signed and Sealed this

Seventeenth Day of August, 2004

JON W. DUDAS
*Acting Director of the United States Patent and Trademark Office*